United States Patent [19]

Miura et al.

[11] Patent Number: 4,934,215
[45] Date of Patent: Jun. 19, 1990

[54] AUTOMATIC TRANSMISSION

[75] Inventors: Masakatsu Miura, Kariya; Masahiko Ando, Okazaki, both of Japan

[73] Assignee: Aisin-Warner Kabushiki Kaisha, Anjo, Japan

[21] Appl. No.: 127,358

[22] Filed: Dec. 1, 1987

[30] Foreign Application Priority Data

Dec. 9, 1986 [JP] Japan .............................. 61-293663

[51] Int. Cl.$^5$ ............................................ F16H 57/10
[52] U.S. Cl. ................................................... 475/283
[58] Field of Search ................................. 74/760, 761

[56] References Cited

U.S. PATENT DOCUMENTS

| | | | |
|---|---|---|---|
| 2,220,174 | 11/1940 | Ravigneaux | 74/760 |
| 3,164,034 | 1/1965 | Kelley | 74/760 |
| 3,877,320 | 4/1975 | Iijima | 74/761 |
| 4,711,138 | 12/1987 | Miura et al. | 74/761 |
| 4,716,787 | 1/1988 | Miura et al. | 74/761 |

FOREIGN PATENT DOCUMENTS 2362840 7/1974 Fed. Rep. of Germany ........ 74/761

2023752 1/1980 United Kingdom ................ 74/761

*Primary Examiner*—Rodney H. Bonck
*Assistant Examiner*—Harold F. Macris
*Attorney, Agent, or Firm*—Kanesaka and Takeuchi

[57] ABSTRACT

An automatic transmission comprising a single planetary gear unit and a dual planetary gear unit has an output member located in its center so that the output member encloses an input shaft.

In the case of a three speed automatic transmission mechanism, a first clutch located around a ring gear of the single planetary gear unit connects the input shaft to this ring gear.

In the case of a four speed automatic transmission mechanism, a third clutch which actuates overdrive is additionally located axially outside the first clutch for connecting the input member to a ring gear of the dual planetary gear unit.

A sun gear common to both planetary units is connected to the input shaft by a second clutch. This clutch has a drum portion upon which a band may act to brake the sun gear.

7 Claims, 12 Drawing Sheets

FIG.3

|   | $C_1$ | $C_2$ | $B_1$ | $B_2$ | $F_1$ |
|---|---|---|---|---|---|
| 1ST | O |  |  | (O) | O |
| 2ND | O |  | O |  |  |
| 3RD | O | O |  |  |  |
| REV |  | O |  | O |  |

FIG.5

|   | $C_1$ | $C_2$ | $C_0$ | $B_1$ | $B_2$ | $F_1$ |
|---|---|---|---|---|---|---|
| 1ST | O |  |  |  | (O) | O |
| 2ND | O |  |  | O |  |  |
| 3RD | O |  | O |  |  |  |
| 4TH |  |  | O | O |  |  |
| REV |  | O |  |  | O |  |

FIG.7

| | AUTOMATIC TRANSMISSION MECHANISM | | | | | ADDITIONAL TRANSMISSION MECHANISM | |
|---|---|---|---|---|---|---|---|
| | $C_1$ | $C_2$ | $B_1$ | $B_2$ | $F_1$ | $C_3$ | $B_4$ |
| 1ST | ○ | | | (○) | ○ | | ○ |
| 2ND | ○ | | ○ | | | | ○ |
| 3RD | ○ | | ○ | | | ○ | |
| 4TH | ○ | ○ | | | | ○ | |
| REV | | ○ | | ○ | | | ○ |

FIG.9

| | AUTOMATIC TRANSMISSION MECHANISM | | | | | | ADDITIONAL TRANSMISSION MECHANISM | |
|---|---|---|---|---|---|---|---|---|
| | $C_1$ | $C_2$ | $C_0$ | $B_1$ | $B_2$ | $F$ | $C_3$ | $B_4$ |
| 1ST | ○ | | | | (○) | ○ | | ○ |
| 2ND | ○ | | | ○ | | | | ○ |
| 3RD | ○ | | | ○ | | | ○ | |
| 4TH | ○ | | ○ | | | | ○ | |
| 5TH | | | ○ | ○ | | | ○ | |
| REV | | ○ | | | ○ | | | ○ |

FIG.13

| | $C_1$ | $C_2$ | $C_0$ | $B_1$ | $B_2$ | $B_3$ | $F_1$ | $F_2$ | $F_0$ |
|---|---|---|---|---|---|---|---|---|---|
| 1ST | ○ | | | | ◌ | | ○ | | |
| 2ND | ○ | | | ◌ | | ○ | | ○ | |
| 3RD | ○ | | ○ | | | | | | ○ |
| 4TH | | | ○ | ○ | | | | | |
| REV | | ○ | | | ○ | | | | |

FIG.15

| | $C_1$ | $C_2$ | $B_1$ | $B_2$ | $B_3$ | $F_1$ | $F_2$ |
|---|---|---|---|---|---|---|---|
| 1ST | ○ | | | ◌ | | ○ | |
| 2ND | ○ | | ◌ | | ○ | | ○ |
| 3RD | ○ | ○ | | | | | |
| REV | | ○ | | ○ | | | |

AUTOMATIC TRANSMISSION

BACKGROUND OF THE INVENTION

1. Field of the Invention

The present invention relates to an automatic transmission exclusively for an automobile used with a torque converter, particularly to a structure of an automatic transmission mechanism.

2. Description of the Prior Art

An automatic transmission, in general, comprises two single planetary gear units, a sun gear which is commonly used with said two single planetary gear units, a carrier of the first planetary gear unit and a ring gear of the second planetary gear unit which are coupled together. The above structure is a so-called Simpson type wherein driving force is input to a ring gear of the first planetary gear unit and/or sun gear selectively, rotary components of the planetary gear units are stopped by a brake or one-way clutch, and output is taken from a ring gear of the second planetary gear unit which is coupled with a carrier of the first planetary gear unit. Then, forward three speeds are obtained.

A four speed automatic transmission is structured based on said forward three speed automatic transmission mechanism comprising two single planetary gear units. In addition to said three speed automatic transmission mechanism, by attaching an over-drive mechanism or under-drive mechanism having one planetary gear unit, forward four speeds are obtained.

An automatic transmission mechanism having an over-drive mechanism is axially arranged because an output member of the over-drive, i.e, a ring gear is coupled axially by an input member of the three speed automatic transmission.

On the other hand, said automatic transmission mechanism having an over-drive mechanism has a counter drive gear at the end of an output shaft (farthest end from an input portion) from which torque is transmitted to an under-drive mechanism placed under the three speed automatic transmission mechanism.

Recently, an automatic transmission has been required to minimize its body based on an increase of a power of an engine and tendency of "Front Engine and Front Drive" style. However, said four speed automatic transmission having three planetary gear units with an O/D mechanism can not satisfy such requirements.

Then, another four speed automatic transmission adding two clutches on a planetary gear unit of Simpson type is proposed. The structure of said automatic transmission is that a third clutch is laid between a sun gear of first planetary gear unit and a sun gear of a second planetary gear unit, (said sun gears are not separated in Simposn type) and the sun gear of the first gear unit is coupled with a carrier of the second gear unit through a fourth clutch.

The operation of the above structure is that the first gear unit and second gear are disconnected by the third clutch, driving force is transmitted to a carrier of the second gear unit by connecting fourth clutch, the sun gear of said second gear unit is fixed, and the overdrive is taken from the ring gear, and then, fourth speed is obtained in addition to third speed.

The above mentioned improved four speed automatic transmission can not satisfy requirement to minimize its body because the structure, like three speed automatic transmission of Simpson type, is axially long, i.e., driving force is input to one end and taken from the other end of the mechanism and both gear units are separated.

Furthermore, as an output member is laid at the end of the shaft where replacement and modification can be done easily, clutches can not be laid. Accordingly, three speed and four speed automatic transmissions have to be produced separately. Due to the above, it is difficult to produce parts and assemble them in common for said two kinds of transmissin mechanisms, so, cost increase is inevitable, and such structure of an automatic transmission can not cope with wide variation of car types.

SUMMARY OF THE INVENTION

While the present invention is believed to be readily understood from the above description, a brief summary will now be set forth.

Explanation will be given in accordance with FIG. 1. An automatic transmission comprises planetary gear units (2), (3), input shaft (5) coupled with a certain rotary component of said planetary gear unit through clutches, output member (9) coupled with rotary component ($CR_1$), restraining means to stop certain rotary components ($R_2$), ($S_1$). Said output member (9) encloses input shaft (5) and is laid in the center of the automatic transmission mechanism. In case of three speed automatic mechanism ($10_1$), first clutch ($C_1$) is laid outside planetary gear units (2), (3). (Refer to lower half of line 1—1 in FIG. 1.)

On the other hand, in case of four speed automatic transmission mechanism ($10_2$), third clutch ($C_0$) which works at over drive condition is laid outside said first clutch ($C_1$). (Refer to upper half of line 1—1 in FIG. 1.)

Three speed automatic transmission ($10_1$) comprises single planetary gear unit (2), dual planetary gear unit (3), carrier ($CR_1$), and sun gear (S). Said carrier ($CR_1$) and sun gear ($S_1$) for both planetary gear unit (2), (3) are connected to one another. Said sun gear ($S_1$) is stopped by restraining means (for example, a first brake) and ring gear ($R_2$) of dual planetary gear unit (3) is stopped by restraining means (for example, second brake and first one-way clutch). Input shaft (5) is connected to ring gear ($R_1$) of single planetary gear unit (2) through first clutch ($C_1$), and connected to sun gear (S1) through second clutch ($C_2$). Carrier ($CR_1$) is connected to output member (9).

As already shown as a second invention, said four speed automatic transmission ($10_2$) has third clutch ($C_0$) outside first clutch ($C_1$) in addition to said three speed automatic transmission ($10_1$). Said third clutch ($C_0$) can be connected or disconnected with input shaft (5), dual planetary gear unit (3) and ring gear ($R_2$).

Base on the above structure, three speed automatic trasmissin ($10_1$) is shifted to forward three speeds, reverse one speed by function of clutches ($C_1$), ($C_2$), brakes ($B_1$), ($B_2$) and one-way clutch ($F_1$). Four speed automatic transmission ($10_2$) is shifted to forward four speed and reverse one speed by function of clutchs ($C_1$), ($C_2$), ($C_0$), brakes ($B_1$), ($B_2$) and one-way clutch ($F_1$). Driving force generated in such transmissions is taken from output portion (9) and transmitted to over drive or under drive mechanism. FIG. 3 is the operation table of three speed automatic transmission ($10_1$).

In forward the first speed, first clutch is connected. The rotation of input shaft (5) is transmitted to ring gear ($R_1$) of singel unit (2), and said rotation rotates sun gear (S) in reverse without load and common carrier (CR) in forward with grately reduced speed because ring gear ($R_2$) of dual unit (3) is stopped by first one-way clutch ($F_1$). Said rotation (reduced speed) is taken from output member (9).

In second speed, first brake ($B_1$) is applied in addition to connection of first clutch ($C_1$). Sun gear (S) is stopped by brake ($B_1$), the rotation of ring gear ($R_1$) makes ring gear ($R_2$) of dual unit (3) rotate in forward without load and also rotate carrier ($CR_1$) in forward with reduced speed, and then, said rotation is taken from output member (9) as second speed.

In third speed, second clutch ($C_2$) is connected in addition to first clutch ($C_1$). The rotation of input shaft (5) is transmitted to ring gear ($R_1$) and sun gear ($S_1$). Due to the above, components of planetary gear unit (2) including carrier (CR) rotate together, and then, the same rotation as that of input shaft (5) is taken from output portion (9) as third speed.

In reverse condition, second clutch ($C_2$) and second brake ($B_2$) work. The rotation of input shaft (5) is transmitted to sun gear (S) through clutch ($C_2$) to rotate ring gear ($R_1$) of single unit (2) and carrier ($CR_1$) in reverse because ring gear ($R_2$) of dual unit (3) is fixed by second brake ($B_2$). Reverse rotation of said carrier is taken from output portion (9).

In first speed of coasting condition, one-way clutch ($F_1$) is released, and second brake ($B_2$) is applied in addition to first clutch ($C_1$). By said brake ($B_2$), ring gear ($R_2$) is fixed, and first speed condition is remained and engine brake works efficiently.

Four speed automatic transmission ($10_2$) as shown in FIG. 1 (upper half of line 1—1) and FIG. 4 operates in accordance with the operation table in FIG. 5. In case of reverse, explanation is eliminated because the motion of the components is the same as three speed automatic transmission ($10_1$).

In third speed, third clutch ($C_0$) is connected in addition to first clutch ($C_1$). The rotation of input shaft (5) is tranmitted to ring gear ($R_1$) of single unit (2) through clutch ($C_1$), and to ring gear ($R_2$) of dual unit (3). The components of both planetary gear units (2), (3) rotate together, and driving force is transmitted to output member (9) at the same rotation speed as input shaft (5).

In fourth speed, first brake ($C_1$) is released and first brake ($B_1$) works. The rotation of input shaft (5) is transmitted to ring gear ($R_2$) of dual unit (3), and as sun gear ($S_1$) is stopped, said input shaft (5) rotates ring gear ($R_1$) faster without load, and ring gear ($R_1$) rotates with high revolution. This high revolution is taken from output member (9) as over-drive.

In said three speed automatic transmission ($10_1$) and four speed automatic transmission ($10_2$), the rotation of carrier ($CR_1$) is transmitted to output member (9) laid in the center of said mechanisms ($10_1$), ($10_2$). Furthermore, said rotation is also transmitted to an additional transmission mechanism from said mechanisms ($10_1$), ($10_2$).

All numbers and symbols in parenthesis in "summary of the invention" are for reference purpose and do not define claims.

BRIEF DESCRIPTION OF DRAWINGS

FIG. 3 is a table of operation of said three speed automatic transmission;

FIG. 5 is a table of operation of said four speed automatic transmission;

FIG. 7 is a table of operation of said embodiment;

FIG. 9 is a table of opeation of antoehr embodiment;

FIG. 13 is a table of operation of said transmission mechanism shown in FIG. 11;

FIG. 15 is a table of operation.

DESCRIPTION OF THE PREFERRED EMBODIMENT

Figure 2:
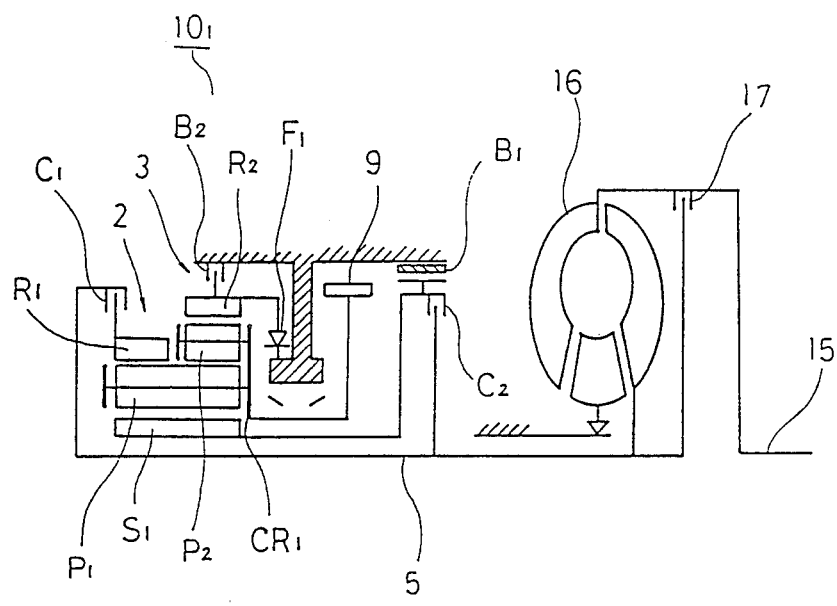
FIG. 2 is a schematic view of a three speed automatic transmission.
Figure 4:
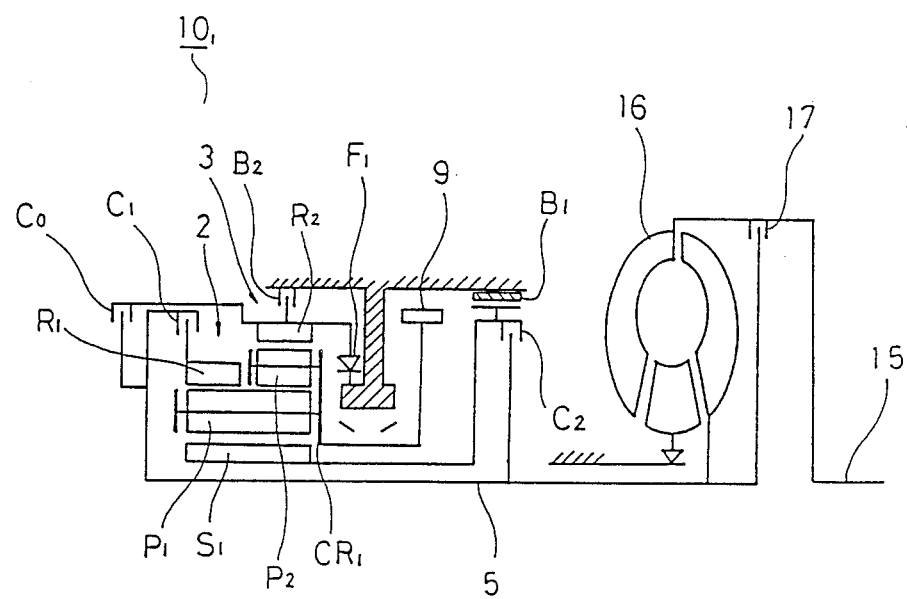
FIG. 4 is a schematic view of a four speed automatic transmission mechanism.

Explanation is given in accordance with the drawings. An automatic transmission $1_2$ having three speed automatic transmission mechanism $10_1$ (lower portion of line 1—1) comprises torque converter portion 31, three speeds automatic transmission mechanism $10_1$, additional transmission mechanism $20_2$ (or $20_1$) and differential portion 35 each of which is contained in a transaxle housing 39, transaxle case 37 and transaxle cover 36. A converter portion 31 comprises torque conveter 16 and lock-up clutch 17. Driving force is transmitted from engine crank shaft 15 (FIG. 2) to input shaft 5 in automatic transmission mechanism $10_1$ through oil flow in torque converter 16 or mechnical direct connection of lock-up clutch 17. Valve body 46 is installed on the upper part of transaxle case 37, and oil pump 47 is laid between automatic trasmission mechanism $10_1$ and troque convetor 31.

In three speed automatic transmission mechanism $10_1$, from inside to outside axially, control portion 49, output portion 50, planetary gear unit portion 51 and clutch portion 6 are arranged. Hollow shaft 53 which rotates freely encloses input shaft 5.

Planetary gear unit portion 51 comprises singel planetary gear unit 2, and dual planetary gear unit 3. Single unit 2 comprises sun gear $S_1$ made coaxially around hollow shaft 53, ring gear $R_1$, and carrier $CR_1$ for supporting pinion $P_1$ meshing with said ring gear $R_1$ and sun gear $S_1$. Dual unit 3 comprises sun gear $S_1$ made coaxially around hollow shaft 53, ring gear $R_2$, and carrier $CR_1$ for supporting first pinion $P_1$ which meshes with sun gear $S_1$ and second pinion $P_2$ which meshes with ring gear $R_2$. Sun gear $S_1$ and pinion $P_1$ for units 2, 3 are made on hollow shaft 53 as "one body". And carrier $CR_1$ is made as "one body" for units 2, 3.

Control portion 49 has second clutch $C_2$ and first brake $B_1$. Second clutch $C_2$ is laid between flange 5a built up from input shaft 5 and flange 53a built up from the edge of hollow shaft 53, and cylinder 53b is laid at the opposite side of 53a in control portion 49. Piston 54 is inserted in said cylinder 54, and spring 55 is installed on the back side of said piston 54. This structure works as a hydraulic accutuator for second clutch $C_2$.

At the circumference of flange 53a, brake drum 53c is fixed to connect or disconnect first brake $B_1$ (band type).

Output portion 50 which is laid in the center of automatic transmission mechanism $10_1$ has output member 9 having boss-portion 9a and output gear 9c (counter drive). Said output member 9 can rotate freely and is supported by separator 37b through bearings 57 which are double tapered roller bearing having two inner races through a spacer ring, and an outer race which is fixed to separator 37b by spline. Said outer race extends axially, and on an extended portion, an inner race of one way clutch $F_1$ is fixed. And also, on the extended portion, coupling part 59 which becomes an outer race of the one-way clutch is fixed with ring gear $R_2$ of dual unit 3 by means of spline. One-way clutch $F_1$ is laid between said races. The above means that said one-way clutch is located coaxially, side by side, and between planetaly gear unit 3 and separator 37b, and said one-way clutch is located inside said ring gear $R_2$. Second brake $B_2$ is located between an outer circumference of ring gear $R_2$ and axle case 37. A cylinder is formed on one side of separator 37b, and actuator 60 having a piston is laid between said one-way clutch and axle case 37. Said hydraulic actuator 60, having cylindrical arm like comb and passing over said one-way clutch $F_1$, controls second brake $B_2$, and has return spring 64 on the comb portion of an arm.

Clutch portion 6 having first clutch $C_1$ is located at an edge of automatic transmission mechanism $10_1$ and is housed in transaxle case 36. Flange 5c into which piston 62 is inserted, is fixed at the edge of input shaft 5, so that a hydraulic actuator for clutch $C_1$ is made. Clutch $C_1$ is laid between an inside of flange 5c and an outside of ring gear $R_1$, and a return spring 63 is installed between a back side of piston 62 and a stop ring.

Figure 1:
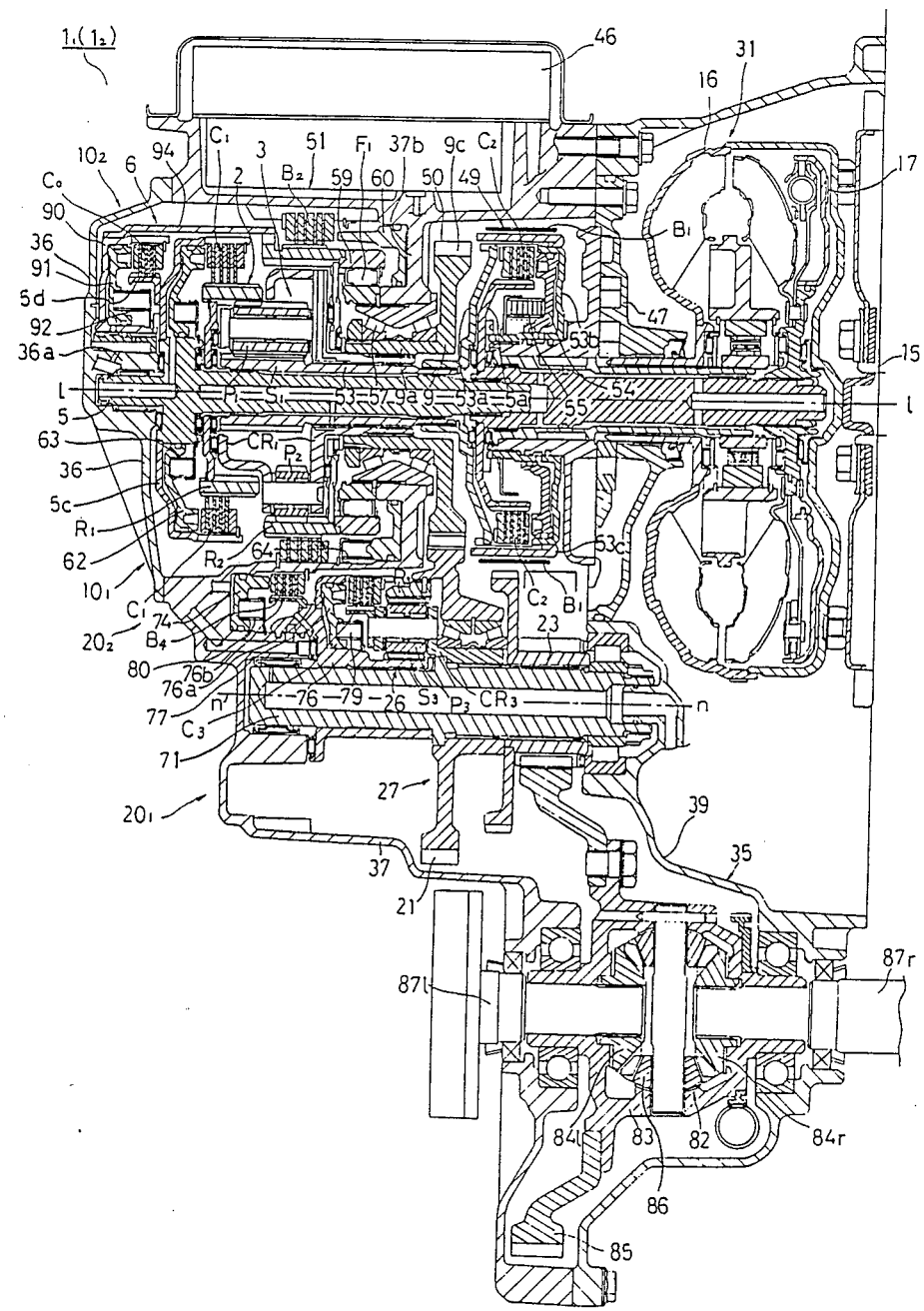
FIG. 1 is a cross sectional view of an automatic transmission of the present invention, wherein different structures are shown by upper and lower parts of lines 1—1, and n—n.

Additional transmission $20_2$, as shown in FIG. 1 (upper half of line n—n), has counter shaft 7 (rotation free) which is supported by axle case 37. At the edge of said shaft 71, singel planetary gear unit 26 for under drive is installed. A differntail drive pinion 23 is connected and coupled on said shaft 71, and couter driven gear 21 (rotation free) meshing counter drive gear 9 is supported on said shaft 71. Said planetary gear unti 26 comprises carrier $CR_3$, which supports sun gear $S_3$ and pinion $P_3$, and is connected to shaft 71, and ring gear $R_3$ which is coupled with counter driven gear 21. Boss portion 76 on which sun gear $S_3$ is made is connected to flanges 76a, 76b, and is free rotationally supported by shaft 71. Fourth brake $B_4$ which is installed on flange 76b is controlled by hydraulic actuator 74 made on case 37. Fourth clutch $C_3$ which is controlled by hydraulic actuator 77 made in flange 76a is laid between an inner circumference of flange 76a and carrier $CR_3$ of gear unit 26. Numerals 79 and 80, in FIG. 1, are return springs of hydraulic actuator.

Differential portion 35 has differential unit 82 and a ring gear mount case 83. Said mount case 83 fixes ring gear 85 meshing differential drive gear 23, and makes up a differential carrier supporting differential pinion 86 of differential gear unti 82. Said gear unti 82 has side gears 84 and 84r meshing said pinion 86, and these side gears are connected to front axles 87 and 87r.

At a lower half of line n—n in FIG. 1, a gear mechanism 27 coupling a counter driven gear 21 and differential drive gear 23 is shown as additional transmission $20_1$.

Figure 6:
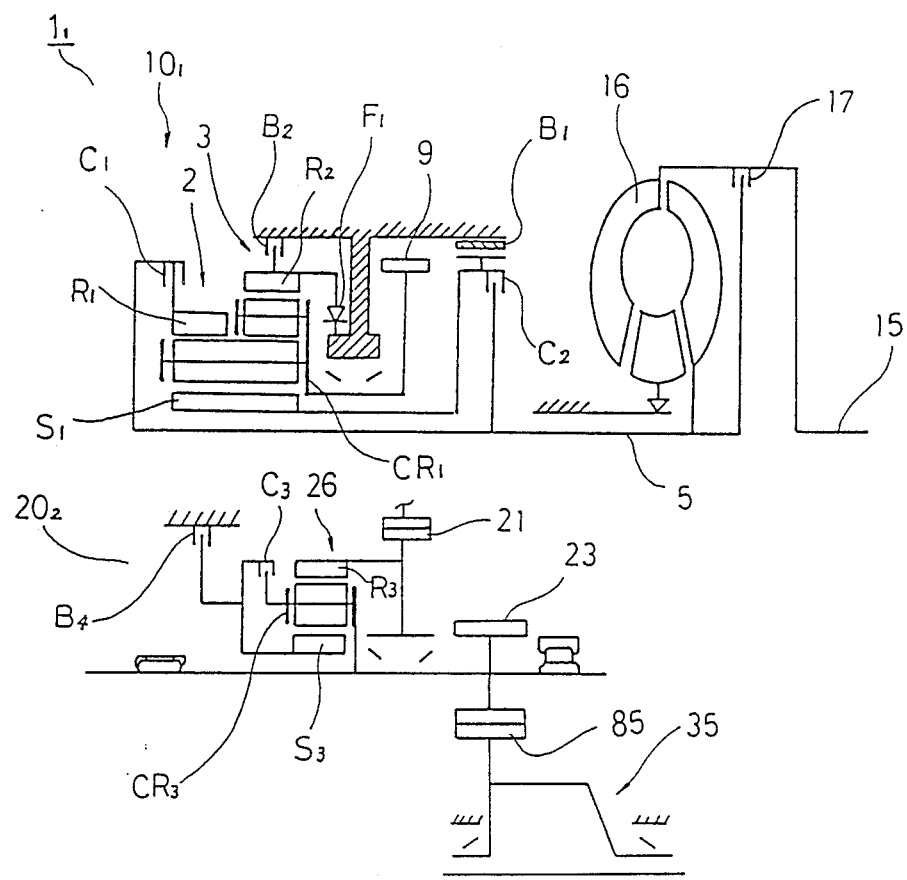
FIG. 6 is a schematic view of an embodiment of an automatic transmission.

The motion of the above embodiment is explained in accordance with FIG. 6 and FIG. 7. Driving force is transmitted to input shaft 5 of three speed automatic transmission mechanism $10_1$ through torque converter 16 or lock-up clutch 17. In said automatic transmission mechanism $10_1$, forward three speed and reverse one speed are obtained based on the motion of each clutch $C_1$, $C_2$, each brake $B_1$, $B_2$, and one-way cltuch $F_1$, and furthermore, said rotation is transmitted to counter driven gear 21 of additional transmission mechanism $20_2$ from counter drive gear 9. In said additional transmission mechanism $20_2$, direct-coupling and under drive conditions are obtained by the motion of clutch $C_3$ and brake $B_4$ as shown in FIG. 7. By the combination of automatic transmission mechanism $10_1$ and additional transmission mechanism $20_2$, forward four speeds (at maximum, six speed is available) is obtained. In other words, mechanism $10_1$ is first and second speeds, and mechanism $20_2$ is under drive condition, it makes first and second speeds from the automatic transmission as a whole. Furthermore, in case mechanism $10_1$ is second speed, and mechanism $20_2$ is direct coupling, it makes third speed from the automatic transmission as a whole. By switching second speed to third speed in mechanism $10_2$, (mechanism $20_2$ is unchanged.), fourth speed is obtained from the automatic transmission as a whole. Said forward four speeds are transmitted to front axles 87 and 87r from differentail gear unit 86 through differntial drive pinion 23 and ring gear 85.

Next explantion is given to an automatic transmission $1_2$ having four speed transmission mechanism $10_2$ in accordance with FIG. 1 (upper half of line 1—1). For the portions except those of clutches 6, explanation is eliminated because they are identical.

An automatic transmission $1_2$ has four speed automatic transmission mechanism $10_2$ which has clutch portion 6 covered by tranaxle cover 36. In said clutch portion 6, third clutch $C_0$ is laid coaxially outside first clutch $C_1$, and consequently, the structure is longitudinally longer for the width of clutch $C_0$ than automatic transmission mechanism $10_1$. Inner extrusion 36a made on transaxle cover 36 supports flange 90 into which piston 91 is inserted to make up hydraulic actuator for third clutch $C_0$. At an outside of said flange 90, drum 94 is fixed, which is connected with slits to ring gear $R_2$. Third clutch $C_0$ is laid between said flange 90 and flange 5c of input shaft 5, and at an inner diameter side of said clutch $C_0$, a return spring 92 for actuator 91 is installed.

Figure 8:
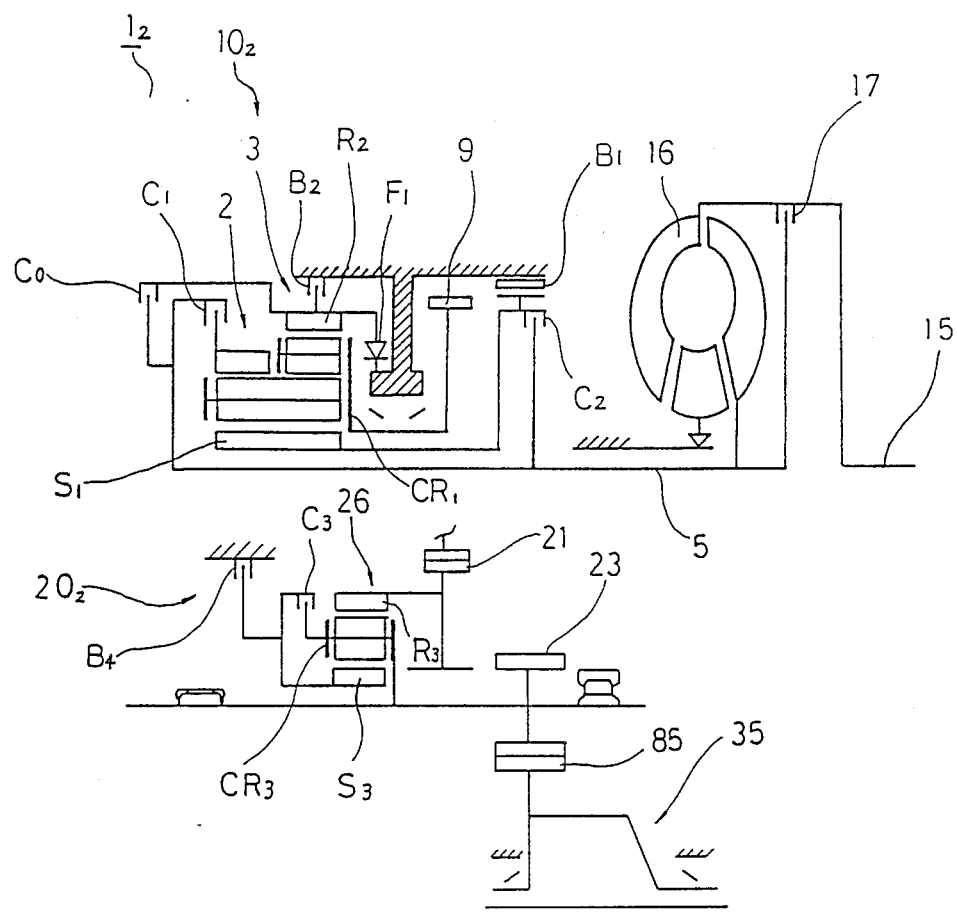
FIG. 8 is a schematic view of another embodiment of an autoamtic transmission.

The motion of the above embodiment is also explained in accordance with FIG. 8 and FIG. 9. Driving force is transmitted to input shaft 5, and at four speed automatic trasmission mechanism $10_2$, forward four speeds and reverse one speed are obtained due to the motion of clutches $C_1$, $C_2$, $C_0$, brakes $B_1$, $B_2$ and one-way clutch $F_1$. The rotation brought from mechanism $10_2$ is shifted to direct coupling and under drive condition due to the motion of clutch $C_0$ and brake $B_4$. Because of the combination of mechanism $10_2$ and additional mechanism $20_2$, forward 5 speeds (at maximum 8 speeds are available) are obtained from the transmission as a whole. In other words, first speed in mechanism $10_2$ and under drive in mechanism $20_2$ become first speed as a whole tranmission mechanism. Furthermore, by shifting mechanism $10_2$ to second speed (Mechansim $20_2$ is unchanged.), second speed is obtained. By shifting additional mechanism $20_2$ to direct coupling (Mechanism $10_2$ is kept at second speed.), third speed is obtained as a whole transmission mechnism. Under said direct coupling condition of additional mechamism $20_2$, by shifting mechanism $10_2$ to third and fourth speeds, fourth and fifth speeds are obtained as a whole transmission mechanism having forward five speeds.

Three speed automatic transmission mechanism $10_1$ and four speed automatic transmission mechanism $10_2$ can be combined with additional transmission mechanism $20_1$ having reduction gear mechanism 27 to obtain forward three and four speed automatic transmission as a whole.

Figure 10:
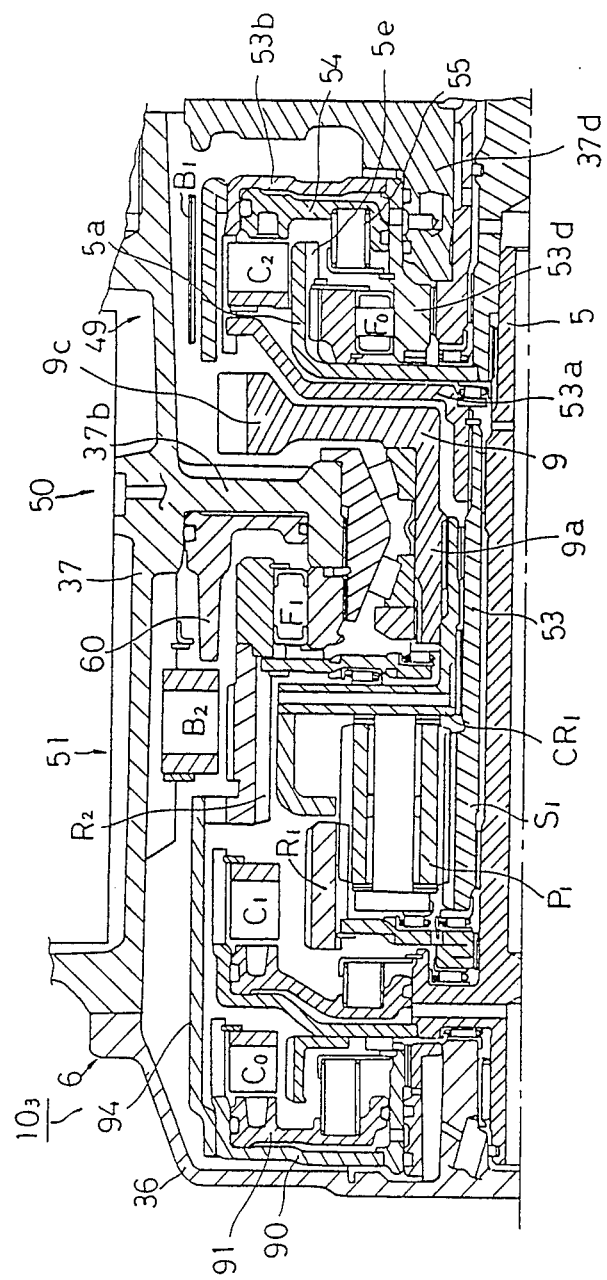
FIG. 10 is a cross sectional view of a partially modified automatic transmission mechanism.

The partially modified embodiment is explained in accordance with FIG. 10.

The main point of this embodiment is to install third one-way clutch $F_0$ to control the rotation of sun gear $S_1$ not to rotate faster than input shaft 5, and others are the same as four speed automatic transmission mechanism $10_2$. Flange $53b$ is coupled with boss $53d$ which is installed in case $37d$. Spline $5e$ which is made on an inner surface of clutch hub $5a$ extending from input shaft 5 is connected to an outer race. Third one-way clutch $F_0$ is installed on the abovementioned boss $53d$ as an inner race. A return spring 55 for a hydraulic actuator of clutch $C_2$ is laid side by side with said one-way clutch $F_0$.

Said one-way clutch releases first clutch $C_1$ along with the motion of brake $B_1$ in the moment of shifting up from third speed to fourth speed, and gives time to the motion of brake $B_1$ based on function to regulate increase of the rotation of sun gear $S_1$ by third one-way clutch $F_0$. Furthermore, said one-way clutch $F_0$ makes motion timing easy and gives smooth shifting by preventing shift shock of gear change.

As same as shift-up, said one-way clutch $F_0$, in the moment of shifting down from fourth speed to third speed gives first clutch $C_1$ room by releasing first brake $B_1$ which prevents the rotation of sun gear $S_1$ from becoming higher than the rotation of input shaft 5, and makes motion timing easy. And said one-way clutch $F_0$ gives smooth shifting by preventing shift shock of gear change.

As already shown in FIG. 10, third one-way clutch is laid between clutch hub $5a$ and boss $53d$, and on the other hand, said one-way clutch $F_0$ can be laid between input shaft 5 and hollow shaft 53.

Figure 11:
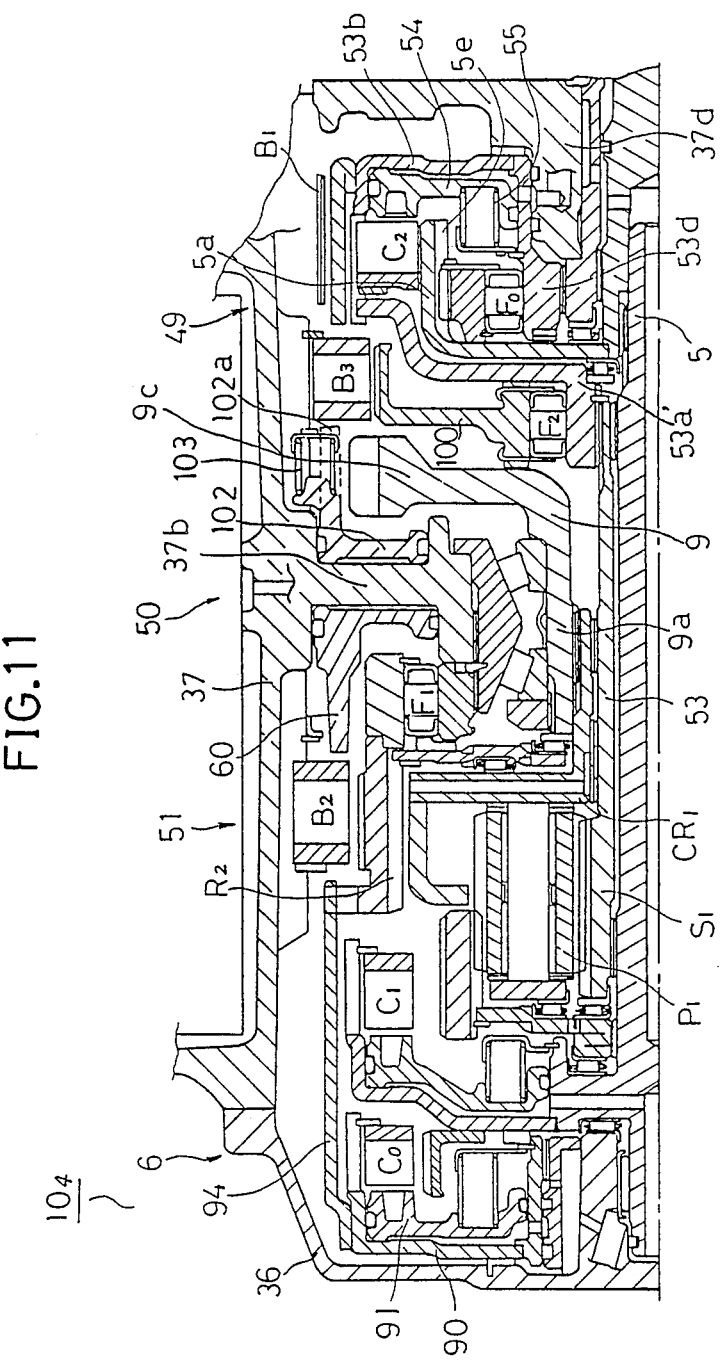
FIG. 11 is a cross sectional view of a further modified automatic transmission mechanism.

Another partially modified embodiment is explained in accordance with FIG. 11. The main point of this embodiment is to install third brake $B_3$ which is laid to restrain the rotation of sun gear $S_1$ through second one-way clutch $F_2$ which restrains the rotation of sun gear $S_1$, and others are the same as four speed automatic transmission mechanism $10_3$ or three speed automatic tranmission mechanism $10_3$.

Second one-way clutch $F_2$ is installed on boss $53'a$ of flange $53a$ coupling with hollow shaft 53. An outer race of said one-way clutch $F_2$ extends outwardly to form coupling porition 100. Third brake $B_3$ which is a multi plate type is laid between said coupling portion 100 and case 37. At a side of gear $9c$ on separator $37b$, a cylinder is made and a piston 102 for a third brake is installed. From said piston 102, an arm $102a$ having comb like fins is extended over the gear $9c$, toward brake $B_3$. A return spring 103 is installed in comb like fins on said arm $102a$. Said arm $102a$ is eliminated in the area where conter drive gear $9c$ meshes coutner driven gear 21.

Figure 12:
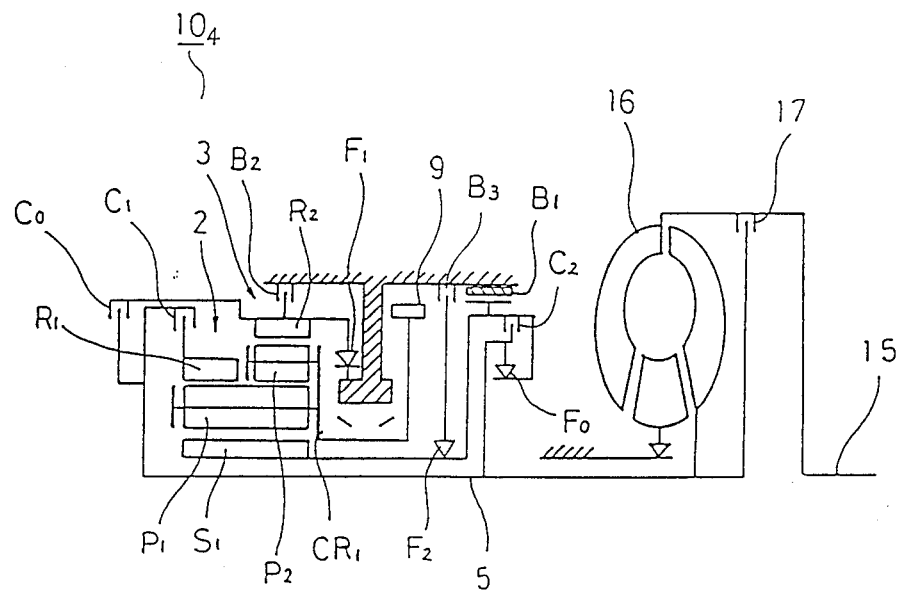
FIG. 12 is a schematic view of said transmisison mechanism shown in FIG. 11.

Four speed automatic transmissin $10_4$ of this partially modified embodiment shown in schematic view of FIG. 12 works as shown in FIG. 13.

Figure 14:
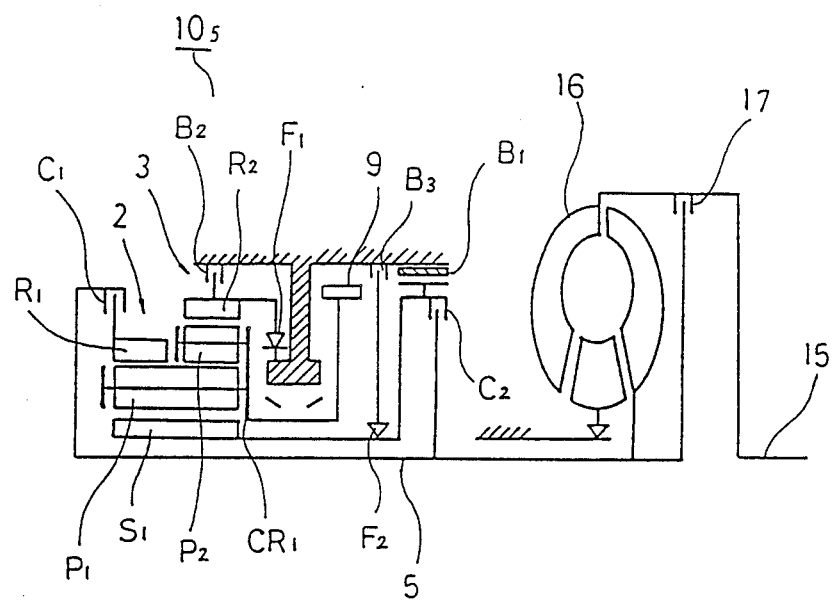
FIG. 14 is a schematic view of an automatic transmission of the embodiment applied to three speed automatic transmission.

Three speed automatic transmisison $10_5$ of this partially modified embodiment shown in schematic view of FIG. 14 works as shown in FIG. 15. At second speed of D range, third brake works in addition to first clutch $C_1$. Then, sun gear $S_1$ is stopped by second one-way clutch $F_2$ based on the application of third brake $B_3$, ring gear $R_1$ which is given rotation from input shaft 5 slowly rotates carrier $CR_1$ and said rotation of carrier $CR_1$ is take up as second speed from counter drive gear 9. At third speed of D range, third clutch $C_0$ or second clutch $C_2$ is connected in addition to first clutch $C_1$, then, counter drive gear 9 rotates at the same speed as input shaft 5. At this time, sufficient time is obtained at motion and release of third brake $B_3$ due to second one-way clutch $F_2$, and consequently, smooth shifting is available by preventing shift stock of gear change. In this embodiment, all shifting motions are performed through one-way clutch, so that shifting among all speeds is smooth. At 2 range, first brake works to stop sun gear. Due to this motion, second speed can be maintained in coasting. As explained through this chapter, in the present invention, automatic transmission mechanism 10 comprising singel planetary gear unit 2 and dual planetary gear unit 3 can be structured small because carrier $CR_1$ and sun gear $S_1$ are used for both units 2, 3. Furthermore, as output member 9 is laid in input shaft 5 so that they are located in the center of an automatic transmission mechanism, transmission path is shortened. Accordingly whole body of the mechanism can be short axially, and rational allocation with additional tranmission mechanism such as under drive mechanism, etc. is available. This means that physical restriction on mounting space in a vehicle is solved.

As output member 9 is located at the center of the automatic transmission mechanism, it is hard to emit gear noise comparing with mechanism having an output portion outside the longitudinal shaft, and this type of mechanism can avoid resonance between a gear and transaxle cover 36.

In three speed automatic transmission mechanism $10_1$, first clutch $C_1$ is located at an outside end along a longitudinal shaft. In four speed automatic transmission mechanism $10_2$, as third clutch $C_0$ is located outside of said first clutch $C_1$, slight modification such as adding said third clutch $C_0$ can make three to four speed automatic transmission mechanism with ease. Due to this modification, manufacture can cope with various requirements without cost increase, and production facility and parts can be utilized in common.

As the rotation of input shaft 5 is transmitted to ring gear $R_2$ through first clutch $C_1$ (and to ring gear $R_1$ through third clutch $C_0$), said rotation is transmitted to ring gears $R_1$ and $R_2$ when running forward, so that tangential force can be reduced, and allowable torque of input can be increased without increasing volume of means for restraint and without thickening cogs. This can comply with recent requirement of higer horse powered vehicles.

In addition to the above, by installing first, second and third one-way clutches ($F_1$, $F_2$, $F_0$) (in case of four speed automatic transmission $10_3$, $10_4$), shifting is performed through one-way clutches, so that smooth shifting is obtained without shift shock of gear change.

What is claimed is:
1. An automatic transmission, comprising:
   an input shaft,
   a planetary gear unit incuding a single planetary gear unit formed of a common sun gear, a first ring gear and a common pinion, and a dual planetary gear unit formed of the common sun gear, a second ring gear, the common pinion, a pinion and a carrier for supporting the common pinion and the pinion, said common sun gear being situated around the input shaft, a first clutch situated around the first ring gear for connecting between the input shaft and the first ring gear, a second clutch situated around the input shaft for connecting between the input shaft and the common sun gear, said second clutch having a drum at an outer periphery thereof, a first brake situated around the drum to regulate rotation of the common sun gear, a second brake for regulating rotation of the second ring gear, and an output member situated around the input member, said output member being connected to the carrier and having an output gear, wherein said first clutch, single planetary gear unit, dual planetary gear unit, output gear and second clutch are situated in sequence to provide a compact transmission.

2. A transmission according to claim 1 further comprising a first one-way clutch connected to the second ring gear for regulating rotation of the second ring gear in one direction.

3. A transmission according to claim 2, further comprising a second one-way clutch connected to the common sun gear for regulating rotation of the common sun gear in one direction, and a third brake connected to the second one-way clutch for stopping rotation of the common sun gear through the second one-way clutch.

4. An automatic transmission according to claim 1, further comprising a third clutch situated adjacent to said first clutch at a side opposite to the single planetary gear unit, said third clutch connecting said input shaft and said second ring gear of said dual planetary gear unit.

5. A transmission according to claim 4 further comprising a first one-way clutch connected to the second ring gear for regulating rotation of the second ring gear in one direction.

6. A transmission according to claim 5, further comprising a third one-way clutch connected to the common sun gear to regulate rotation of the common sun gear not to exceed rotation of the input shaft.

7. A transmission according to claim 6, further comprising a second one-way clutch connected to the common sun gear for regulating rotation of the common sun gear in one direction, and a third brake connected to the second one-way clutch for stopping rotation of the common sun gear through the second one-way clutch.

* * * * *